(12) United States Patent
Li et al.

(10) Patent No.: US 11,597,844 B2
(45) Date of Patent: Mar. 7, 2023

(54) MULTI-COATING RADIATION-CURED PRE-COATING FILM AND PREPARATION METHOD THEREOF

(71) Applicant: Banfert New Materials Co., Ltd., Changsha (CN)

(72) Inventors: XinXiong Li, Changsha (CN); He Nian Long, Changsha (CN); Hui Li, Changsha (CN); DongMing Zhang, Changsha (CN); Shizhen Li, Changsha (CN); XiuLin Deng, Changsha (CN)

(*) Notice: Subject to any disclaimer, the term of this patent is extended or adjusted under 35 U.S.C. 154(b) by 94 days.

(21) Appl. No.: 17/027,821

(22) Filed: Sep. 22, 2020

(65) Prior Publication Data

US 2021/0155804 A1 May 27, 2021

Related U.S. Application Data

(63) Continuation of application No. PCT/CN2019/120508, filed on Nov. 25, 2019.

(51) Int. Cl.
*C09D 4/06* (2006.01)
*C09D 175/14* (2006.01)
(Continued)

(52) U.S. Cl.
CPC ............... *C09D 4/06* (2013.01); *C09D 5/002* (2013.01); *C09D 135/02* (2013.01); *C09D 175/14* (2013.01)

(58) Field of Classification Search
CPC ........ C09D 4/06; C09D 5/002; C09D 135/02; C09D 175/14; C09D 175/16; B05D 7/576;
(Continued)

(56) References Cited

U.S. PATENT DOCUMENTS 5,300,172 A * 4/1994 Ishiwata ............. H01L 21/3081
156/289
8,754,145 B1 * 6/2014 Haubrich ............. C09D 133/14
520/1
(Continued)

OTHER PUBLICATIONS

Patel, Mitesh Ramanlal; et al., "Biomaterial Based Novel Polyurethane Adhesives for Wood to Wood and Metal to Metal Bonding", Jun. 6, 2009, Materials Research, vol. 2, No. 4, p. 386 (Year: 2009).*

*Primary Examiner* — Callie E Shosho
*Assistant Examiner* — Steven A Rice
(74) *Attorney, Agent, or Firm* — Rumit Ranjit Kanakia (57) ABSTRACT

The present application relates to the technical field of floor surface decoration materials, and particularly provides a multi-coating radiation-cured pre-coating film and a preparation method therefor. The first aspect of the present application provides the multi-coating radiation-cured pre-coating film, which sequentially comprises a flexible transparent film layer and a radiation-cured coating from bottom to top, wherein the radiation-cured coating sequentially comprises a radiation-cured elastic primer layer and a radiation-cured wear-resistant finish paint layer from bottom to top, the at least one radiation-cured elastic primer layer and the at least one radiation-cured wear-resistant finish paint layer are arranged, and the radiation-cured elastic primer layer equentially comprises a radiation-cured elastic wear-resistant primer layer and a radiation-cured elastic matte/bright primer layer from bottom to top.

7 Claims, 1 Drawing Sheet

(51) Int. Cl.
*C09D 135/02* (2006.01)
*C09D 5/00* (2006.01)

(58) Field of Classification Search
CPC ....... B05D 7/586; B05D 7/04; C08F 290/067; C08G 18/672; C08G 18/4202; C08G 18/44; C08G 18/4277; C08G 18/4238; C08G 18/3212; C08G 18/3215; C08G 18/73
USPC ....................................................... 428/423.1
See application file for complete search history.

(56) References Cited

U.S. PATENT DOCUMENTS

| | | | |
|---|---|---|---|
| 2006/0167190 A1* | 7/2006 | Trabesinger | C08G 18/10 525/474 |
| 2011/0184125 A1* | 7/2011 | Zhao | C08G 18/672 427/532 |
| 2017/0313911 A1* | 11/2017 | Fukuda | B29C 41/00 |
| 2021/0276309 A1* | 9/2021 | Shimizu | C09D 175/16 |

* cited by examiner

MULTI-COATING RADIATION-CURED PRE-COATING FILM AND PREPARATION METHOD THEREOF

FIELD

The present application relates to the technical field of floor surface decoration materials, and particularly provides a multi-coating radiation-cured pre-coating film and a preparation method thereof.

BACKGROUND

Along with increasingly strict environmental protection laws and regulations and increasingly louder environmental protection calls, consumers have higher requirements on repeated coating and mounting modes of floors, and development of novel construction modes is extremely urgent. Conventional film coating (also called laminating) has the characteristics of construction simplicity and environmental friendliness, a film-coated product has certain waterproof, fading-proof and stain-resistant effects, the texture and the grade of a base material are improved, but the strength is poor, and the film-coated product does not have wear-resistant and scratch-resistant effects, so that at present, the film coating is only used in printed matter markets and various packaging product markets without high requirements on wear resistance, scratch resistance, strength and other properties, and has not yet been applied to the coating fields of floors, furniture and the like.

Besides, in the actual use process, in order to meet the requirements of the consumers for the different properties such as the wear resistance, the scratch resistance and the strength of the surfaces of the floors, various functional coatings are often added to the surfaces of the floors to meet the requirements of the different consumers for the different types of floors, but various problems are likely to occur to the prepared floors while diversified floor production is achieved, for example, binding force between the floors and coatings is poor, and the coatings are nondurable and are prone to shedding, which results in shortening of the service life of the floors. In addition, for part of PVC floors with lines, the produced PVC floors are sometimes prone to uneven gloss, and the difference between the floors is large.

SUMMARY

Figure 1:
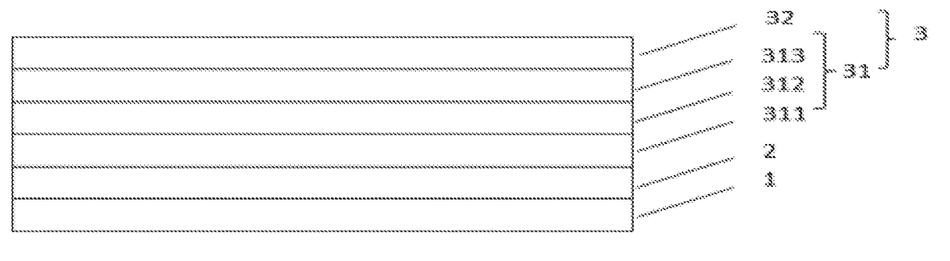
FIG. 1 is a structural schematic diagram of a coating radiation-cured pre-coating film.

In order to solve the above technical problems, a first aspect of the present application provides a multi-coating radiation-cured pre-coating film, which sequentially comprises a flexible transparent film layer 1 and a radiation-cured coating 3 from bottom to top, wherein the radiation-cured coating 3 sequentially comprises a radiation-cured elastic primer layer 31 and a radiation-cured wear-resistant finish paint layer 32 from bottom to top, the at least one radiation-cured elastic primer layer 31 and the at least one radiation-cured wear-resistant finish paint layer 32 are arranged, and the radiation-cured elastic primer layer 31 sequentially comprises a radiation-cured elastic wear-resistant primer layer 312 and a radiation-cured elastic matte/bright primer layer 313 from bottom to top.

As a preferred technical solution of the present application, a pretreatment layer 2 is used for pretreating a surface of a flexible transparent film layer 1, which is arranged between the flexible transparent film layer 1 and a radiation-cured coating 3.

As a preferred technical solution of the present application, a bottom layer of a radiation-cured elastic wear-resistant primer layer 312 is provided with a radiation-cured elastic adhesion primer layer 311.

As a preferred technical solution of the present application, the raw materials for preparing the pretreatment layer 2 comprise, in parts by weight, 2 to 10 parts of bifunctional polyurethane acrylate resin, 0 to 5 parts of vinyl chloride-vinyl acetate resin, 30 to 40 parts of bifunctional acrylate monomers, 30 to 50 parts of solvents, and 0 to 1 part of an initiator.

As a preferred technical solution of the present application, preparation materials of the radiation-cured elastic adhesion primer layer 311 comprise, in parts by weight, 30 to 60 parts of bifunctional polyurethane acrylate resin, 20 to 40 parts of bifunctional acrylate monomers, 10 to 15 parts of monofunctional acrylate, and 0 to 5 parts of initiators.

As a preferred technical solution of the present application, monofunctional acrylate is selected from any one or a combination of more of isobornyl acrylate, acryloylmorpholine, 2-hydroxyethyl methacrylate, acrylic acid, methyl acrylate, ethyl acrylate, n-propyl acrylate, n-butyl acrylate, lauryl acrylate, octadecyl acrylate, isopropyl acrylate, isobutyl acrylate, tert-butyl acrylate, hydroxyethyl acrylate, hydroxypropyl acrylate, hydroxybutyl acrylate and ethoxyethyl acrylate.

As a preferred technical solution of the present application, the relative molecular weight of bifunctional polyurethane acrylate resin is greater than 3000; and preferably, preparation materials of the bifunctional polyurethane acrylate resin comprise polyol, isocyanate, and hydroxyl-containing acrylate monomers, wherein the molar ratio of the polyol to the isocyanate is 1:2 to 5.

As a preferred technical solution of the present application, polyol comprises component A polyol and component B polyol, the relative molecular weight of component A is 500 to 10000; the relative molecular weight of component B is 450 to 30; and preferably the molar ratio of component A to component B is (1 to 3):1.

As a preferred technical solution of the present application, a molecular formula of component A polyol is OH—$R_3$—COO—$R_1$—COO—$R_2$—OH, and $R_3$, $R_1$, and $R_2$ are selected from any groups; and preferably, component B polyol is selected from any one or a combination of more of 1,4-butanediol, 1,4-cyclohexanedimethanol, hydroxyethylated bisphenol A, ethylene glycol, propylene glycol, hexylene glycol, p-phenylene glycol, neopentyl glycol, and diethylene glycol.

A second aspect of the present application provides a composite material containing a multi-coating radiation-cured pre-coating film.

Compared with the prior art, the present application provides a coating solution of a plurality of coatings, wear resistance and scratch resistance are greatly improved, a radiation-cured coating of the multi-coating radiation-cured pre-coating film has excellent elasticity, in addition, adhesive force of a pre-coating film layer on a surface of a base plate is improved by utilizing an adhesion bottom layer and an elastic bottom layer to cooperate with a flexible film material, meanwhile, better processing property can be favorably maintained under a high-temperature condition, and the problem of whitening or cracking in the processing process is avoided, so that a favorable material basis is provided for simplifying processing production of a traditional PVC composite material.

BRIEF DESCRIPTION OF THE DRAWINGS

Reference Symbols: 1—flexible transparent film layer; 2—pretreatment layer; 3—radiation—cured coating; 31—radiation—cured elastic primer layer; 32—radiation—cured wear—resistant finish paint layer; 311—radiation—cured elastic adhesion primer layer; 312—radiation—cured elastic wear—resistant primer layer; 313—radiation—cured elastic matte/bright primer layer.

DETAILED DESCRIPTION OF THE EMBODIMENTS

All parts and percentages herein are based on weight, and the employed test and characterization methods are in synchronization with the filing date of the present application unless otherwise indicated, implied from the context, or otherwise customary in the art. Term definitions provided in the present application shall prevail if definitions of particular terms disclosed in the prior art are inconsistent with any definitions provided in the present application.

Specific embodiments is intended to further clearly and completely describe technical features below in the technical solution provided by the present application, instead of limiting the scope of protection of the technical features.

The words of "preferred", "preferably", "more preferred" and the like in the present application refer to embodiments of the present application, which may provide certain beneficial effects in certain circumstances. However, other embodiments may also be preferred under the same or other circumstances. Furthermore, the statement of one or more preferred embodiments does not imply that other embodiments cannot be used, nor is it intended to exclude other embodiments from the scope of the present application. The sources of components not mentioned in the present application are all commercially available.

In order to solve the above technical problems, a first aspect of the present application provides a multi-coating radiation-cured pre-coating film, which sequentially comprises a flexible transparent film layer 1 and a radiation-cured coating 3 from bottom to top, wherein the radiation-cured coating 3 sequentially comprises a radiation-cured elastic primer layer 31 and a radiation-cured wear-resistant finish paint layer 32 from bottom to top, the at least one radiation-cured elastic primer layer 31 and the at least one radiation-cured wear-resistant finish paint layer 32 are arranged, and the radiation-cured elastic primer layer 31 sequentially comprises a radiation-cured elastic wear-resistant primer layer 312 and a radiation-cured elastic matte/bright primer layer 313 from bottom to top.

In an embodiment, a pretreatment layer 2 used for pretreating a surface of the flexible transparent film layer 1 is arranged between the flexible transparent film layer 1 and the radiation-cured coating 3.

In an embodiment, a bottom layer of the radiation-cured elastic wear-resistant primer layer 312 is provided with a radiation-cured elastic adhesion primer layer 311.

In an embodiment, the thickness of the flexible transparent film layer is 50 μm to 1 mm; preferably, the thickness of the flexible transparent film layer is 200 μm to 500 μm; and more preferably, the thickness of the flexible transparent film layer is 350 μm.

In an embodiment, the layer number of the radiation-cured elastic primer layer is 1 to 3; preferably, the layer number of the radiation-cured elastic primer layer is 1 to 2; and more preferably, the layer number of the radiation-cured elastic primer layer is 1.

In an embodiment, the layer number of the radiation-cured wear-resistant finish paint layer is 1 to 3; preferably, the layer number of the radiation-cured wear-resistant finish paint layer is 1 to 2; and more preferably, the layer number of the radiation-cured wear-resistant finish paint layer is 1.

In an embodiment, preparation raw materials of the pretreatment layer 2 comprise, in parts by weight, 2 to 10 parts of bifunctional polyurethane acrylate resin, 0 to 5 parts of vinyl chloride-vinyl acetate resin, 30 to 40 parts of bifunctional acrylate monomers, 30 to 50 parts of solvents, and 0 to 1 part of an initiator; preferably, the preparation raw materials comprise 4 to 8 parts of the bifunctional polyurethane acrylate resin, 1 to 4 parts of the vinyl chloride-vinyl acetate resin, 33 to 38 parts of the bifunctional acrylate monomers, 35 to 45 parts of the solvents, and 0.2 to 0.8 part of the initiator; and more preferably, the preparation raw materials comprise 6 parts of the bifunctional polyurethane acrylate resin, 3 parts of the vinyl chloride-vinyl acetate resin, 35 parts of the bifunctional acrylate monomers, 40 parts of the solvents, and 0.5 part of the initiator.

In an embodiment, preparation raw materials of the radiation-cured elastic adhesion primer layer 311 comprise, in parts by weight, 30 to 60 parts of the bifunctional polyurethane acrylate resin, 20 to 40 parts of the bifunctional acrylate monomers, 10 to 15 parts of monofunctional acrylate, and 0 to 5 parts of the initiators; preferably, the preparation raw materials comprise 40 to 50 parts of the bifunctional polyurethane acrylate resin, 25 to 35 parts of the bifunctional acrylate monomers, 11 to 14 parts of the monofunctional acrylate, and 1 to 4 parts of the initiators; and more preferably, the preparation raw materials comprise 45 parts of the bifunctional polyurethane acrylate resin, 30 parts of the bifunctional acrylate monomers, 13 parts of the monofunctional acrylate, and 3 parts of the initiators.

In an embodiment, the bifunctional acrylate monomer is selected from any one or a combination of more of 1,6-hexanediol diacrylate, neopentyl glycol diacrylate, dipropylene glycol diacrylate, and tripropylene glycol diacrylate; and preferably, the bifunctional acrylate monomer is the 1,6-hexanediol diacrylate.

In an embodiment, the vinyl chloride-vinyl acetate resin is binary vinyl chloride-vinyl acetate resin and/or ternary vinyl chloride-vinyl acetate resin.

The present application does not particularly limit purchasers, and in an embodiment, the vinyl chloride-vinyl acetate resin is purchased from Dongguan Yifan Resin Co., Ltd., which is vinyl chloride-vinyl acetate resin 14-50.

In an embodiment, the solvent is selected from any one or a combination of more of ethyl acetate, butyl acetate, dimethyl succinate, dimethyl glutarate, dimethyl adipate, methanol, n-butanol, and ethanol.

In an embodiment, the monofunctional acrylate is selected from any one or a combination of more of isobornyl acrylate, acryloylmorpholine, 2-hydroxyethyl methacrylate, n-propyl acrylate, n-butyl acrylate, lauryl acrylate, octadecyl acrylate, isopropyl acrylate, isobutyl acrylate, tert-butyl acrylate, hydroxyethyl acrylate, hydroxypropyl acrylate, hydroxybutyl acrylate and ethoxyethyl acrylate; preferably, the monofunctional acrylate is the isobornyl acrylate and the acryloylmorpholine; further preferably, the weight ratio of the isobornyl acrylate to the acryloylmorpholine is 1:(0.3 to 0.8); and more preferably, the weight ratio of the isobornyl acrylate to the acryloylmorpholine is 1:0.5.

In an embodiment, the initiator is selected from one or more of 1-hydroxycyclohexyl phenyl ketone (184), 2-hydroxy-2-methyl-1-phenyl-1-acetone (1173), 2-phenylbenzyl-2-dimethylamine-1-(4-morpholinobenzyl) butanone (369), phenyl bis(2,4,6-trimethylbenzoyl) phosphine oxide (819) and (2,4,6-trimethylbenzoyl) diphenyl phosphine oxide (TPO); and preferably, the initiator is the (2, 4, 6-trimethylbenzoyl) diphenyl phosphine oxide (TPO).

The relative molecular weight of the bifunctional polyurethane acrylate resin is greater than 3000; preferably, preparation materials of the bifunctional polyurethane acrylate resin comprise polyol, isocyanate, and hydroxyl-containing acrylate monomers, wherein the molar ratio of the polyol to the isocyanate is 1:2 to 5, and preferably, the molar ratio of the polyol to the isocyanate is 1:3.5.

In an embodiment, the content of the hydroxyl-containing acrylate monomer is used for completely blocking the isocyanate.

In an embodiment, the polyol comprises component A polyol and component B polyol, the relative molecular weight of component A is 500 to 10000, and the relative molecular weight of component B is 450 to 30.

In an embodiment, the molar ratio of component A to component B is (1 to 3):1; and more preferably, the molar ratio of component A to component B is 2:1.

In an embodiment, the molecular formula of component A polyol is OH—$R_3$—COO—$R_1$—COO—$R_{2-0}$H, wherein $R_3$, $R_1$, and $R_2$ are selected from any groups; preferably, the component A polyol is selected from any one or a combination of more of polycaprolactone dihydric alcohol, polyneopentyl glycol adipate dihydric alcohol, polycarbonate diol, poly-1,4-butanediol adipate diol, poly-hexanedioyl glycol-propylene glycol ester diol, polybutylene succinate dihydric alcohol, polyneopentyl glycol adipate-1,4-butanediol ester diol, polypropylene glycol ether diol, polytetrahydrofurazone ether glycol, polyadipic acid-1, 6 hexanediol ester glycol, and polydimethyl phthalate propylene glycol ester glycol; preferably, the component A polyol comprises the polycaprolactone dihydric alcohol, the polyneopentyl glycol adipate dihydric alcohol and the polycarbonate dihydric alcohol; further preferably, the weight ratio of the polycaprolactone dihydric alcohol to the polyneopentyl glycol adipate dihydric alcohol to the polycarbonate dihydric alcohol is 1:(0.5 to 1.5):(0.5 to 1.5); and more preferably, the weight ratio of the polycaprolactone dihydric alcohol to the polyneopentyl glycol adipate dihydric alcohol to the polycarbonate dihydric alcohol is 1:1:0.6.

In an embodiment, the weight-average molecular weight of the polycaprolactone dihydric alcohol is 1000 to 3000; and preferably, the weight-average molecular weight of the polycaprolactone dihydric alcohol is 2000 to 2500.

In an embodiment, the weight-average molecular weight of the polyneopentyl glycol adipate dihydric alcohol is 2000 to 4000; and preferably, the weight-average molecular weight of the polyneopentyl glycol adipate dihydric alcohol is 3000 to 3500.

In an embodiment, the weight-average molecular weight of the polycarbonate dihydric alcohol is 2000 to 4000; and preferably, the weight-average molecular weight of the polycarbonate dihydric alcohol is 3000 to 3500.

The present application does not particularly limit purchasers of the polycaprolactone dihydric alcohol, the polyneopentyl glycol adipate dihydric alcohol and the polycarbonate dihydric alcohol, and in an embodiment, the polycaprolactone dihydric alcohol, the polyneopentyl glycol adipate dihydric alcohol and the polycarbonate dihydric alcohol are separately purchased from Xuchuan Chemical.

In an embodiment, the component B polyol is selected from any one or a combination of more of 1,4-butanediol, 1,4-cyclohexanedimethanol, hydroxyethylated bisphenol A, ethylene glycol, propylene glycol, hexylene glycol, p-phenylene glycol, neopentyl glycol, and diethylene glycol; preferably, the component B polyol is selected from any one or a combination of more of the 1,4-butanediol, the 1,4-cyclohexanedimethanol, and the hydroxyethylated bisphenol A; further preferably, the component B polyol comprises the 1,4-butanediol, the 1,4-cyclohexanedimethanol, and the hydroxyethylated bisphenol A; further preferably, the weight ratio of the 1,4-butanediol to the 1,4-cyclohexanedimethanol to the hydroxyethylated bisphenol A is 1:(0.3 to 0.5):(0.1 to 0.3); and more preferably, the weight ratio of the 1,4-butanediol to the 1,4-cyclohexanedimethanol to the hydroxyethylated bisphenol A is 1:0.45:0.2.

In an embodiment, the hydroxyl-containing acrylate monomer is selected from any one or a combination of more of the hydroxyethyl acrylate, the 2-hydroxyethyl methacrylate, the hydroxybutyl acrylate, hydroxy methyl acrylate and hydroxypropyl methacrylate.

In an embodiment, the isocyanate is selected from any one or a combination of more of toluene diisocyanate, isophorone diisocyanate, diphenylmethane diisocyanate, dicyclohexylmethane diisocyanate, hexamethylene diisocyanate and lysine diisocyanate.

In an embodiment, the flexible transparent film layer can select any one of a PVC film, a PET film, a PETG film, a PP film, a PC film, a PMMA film and a PA film, and preferably adopt the PVC film; and the present application does not particularly limit the source of the PVC transparent film layer, and in an embodiment, the PVC transparent film layer is purchased from Jiangsu Green Meibang.

In an embodiment, a preparation method of the multi-coating radiation-cured pre-coating film is as follows:

(1) uniformly stirring the preparation raw materials of the pretreatment layer 2 and the radiation-cured elastic adhesion primer layer 311 through dispersing kettles separately;

(2) uniformly coating a surface of the flexible transparent film layer 1 with the pretreatment layer 2 through a roller, and performing LED curing;

(3) uniformly coating a surface of the pretreatment layer 2 with the radiation-cured elastic adhesion primer layer 311 through the roller, and performing LED curing;

(4) uniformly coating a surface of the radiation-cured elastic adhesion primer layer 311 with the radiation-cured elastic wear-resistant primer layer 312 through the roller, and performing LED curing;

(5) uniformly coating a surface of the radiation-cured elastic wear-resistant primer layer 312 with the radiation-cured elastic matte primer layer 313 through the roller, and performing LED curing; and (6) uniformly coating a surface of the radiation-cured elastic matte primer layer 313 with the radiation-cured wear-resistant finish paint layer 32 through the roller, and performing mercury lamp curing; and obtaining the multi-coating radiation-cured pre-coating film.

In an embodiment, the coating weight of the radiation-cured elastic adhesion primer layer is 2 to 20 $g/m^2$, the coating weight of the radiation-cured elastic wear-resistant primer layer is 10 to 100 $g/m^2$, the coating weight of the radiation-cured elastic matte/bright primer layer is 4 to 20 $g/m^2$, the coating weight of the radiation-cured wear-resistant finish paint layer is 4 to 20 $g/m^2$, and the total coating weight of the radiation-cured elastic adhesion primer layer, the radiation-cured elastic wear-resistant primer layer, the radiation-cured elastic matte/bright primer layer and the radiation-cured wear-resistant finish paint layer is controlled to be 20 to 150 $g/m^2$; preferably, the coating weight of the radiation-cured elastic adhesion primer layer is 5 to 15 $g/m^2$, the coating weight of the radiation-cured elastic wear-resistant primer layer is 20 to 80 $g/m^2$, the coating weight of the radiation-cured elastic matte/bright primer layer is 10 to 15 g/m², the coating weight of the radiation-cured wear-resistant finish paint layer is 10 to 15 g/m², and the total coating weight of the radiation-cured elastic adhesion primer layer, the radiation-cured elastic wear-resistant primer layer, the radiation-cured elastic matte/bright primer layer and the radiation-cured wear-resistant finish paint layer is controlled to be 60 to 100 g/m²; and more preferably, the coating weight of the radiation-cured elastic adhesion primer layer is 10 g/m², the coating weight of the radiation-cured elastic wear-resistant primer layer is 50 g/m², the coating weight of the radiation-cured elastic matte/bright primer layer is 12 g/m², and the coating weight of the radiation-cured wear-resistant finish paint layer is 13 g/m².

In an embodiment, the coating weight of the pretreatment layer 2 is 3 to 20 g/m²; preferably, the coating weight of the pretreatment layer 2 is 4 to 10 g/m²; and more preferably, the coating weight of the pretreatment layer 2 is 4 g/m².

In an embodiment, the wavelength of an LED light source in step (2) is 200 to 800 nm, and the energy intensity of a lamp source is greater than 7 W/cm²; and preferably, the wavelength of the LED light source in step (2) is selected from 365 nm, 385 nm and 395 nm, and the energy intensity of the lamp source is 10 to 12 W/cm².

In an embodiment, the wavelength of an LED light source in step (3) is 200 to 800 nm, and the energy intensity of a lamp source is greater than 7 W/cm²; and preferably, the wavelength of the LED light source in step (3) is selected from 365 nm, 385 nm and 395 nm, and the energy intensity of the lamp source is 10 to 12 W/cm².

In an embodiment, the wavelength of an LED light source in step (4) is 200 to 800 nm, and the energy intensity of a lamp source is greater than 7 W/cm²; and preferably, the wavelength of the LED light source in step (4) is selected from 365 nm, 385 nm and 395 nm, and the energy intensity of the lamp source is 10 to 12 W/cm².

In an embodiment, the wavelength of an LED light source in step (5) is 200 to 800 nm, and the energy intensity of a lamp source is greater than 7 W/cm²; and preferably, the wavelength of the LED light source in step (5) is selected from 365 nm, 385 nm and 395 nm, and the energy intensity of the lamp source is 10 to 12 W/cm².

A second aspect of the present application provides a composite material containing a multi-coating radiation-cured pre-coating film.

In the preparation process of a traditional PVC floor composite material, a PVC plate base material is obtained through high-temperature press-fit forming of a PVC bottom plate and a PVC film, and then an ultraviolet curing coating is made on the PVC plate base material, so that a PVC floor finished product is obtained. A PVC floor coating obtained according to such a process is poor in adhesive force, and paint is prone to local shedding, which affects the attractiveness of a PVC floor; in addition, for part of PVC floors with lines, the produced PVC floors are sometimes prone to uneven gloss; according to the present application, a pre-coating film layer of a multi-layer structure is tried to be prepared, the pre-coating film layer and a base plate can be directly pressed-fit together to form a material; but a qualified PVC pre-coating film cannot be obtained if the paint is made on the PVC film at will, and the PVC pre-coating film has a plurality of problems of rolling cracking as well as whitening, cracking, yellowing and the like in the subsequent press-fit forming of the PVC floor.

The applicant finds that when the multi-layer pre-coating film layer material provided by the present application is adopted, the above problems can be well avoided, the wear resistance and the scratch resistance can be greatly improved probably due to adoption of a coating scheme of a plurality of coatings, and the radiation-cured coating of the multi-coating radiation-cured pre-coating film has excellent elasticity, so that flexibility is good, the problem of warping of a multi-coating film can be solved, and the composite material applying the multi-coating radiation-cured pre-coating film has good wear resistance, good scratch resistance and good dimensional stability; and besides, when a specific treatment layer is adopted to treat a flexible film material and the elastic adhesion primer layer is arranged, use performance of the composite material can be further improved, probably due to the fact that the pretreatment layer uses the monomers and the solvents which plays a corrosion role in the PVC film and the vinyl chloride-vinyl acetate resin is similar to vinyl chloride in a PVC film structure in polarity, the adhesive force of the coating to the PVC film can be greatly improved, a small amount of the bifunctional polyurethane acrylate in the pretreatment layer plays a bridging connection role between the PVC film and an elastic primer coating, a high proportion of the bifunctional polyurethane acrylate is used in an elastic adhesion primer coating, the bifunctional polyurethane acrylate has extremely good toughness and elongation, so that the anti-yellowing property is good, and conventional and common paint can be used for a subsequently coated functional layer and a subsequently coated finish paint layer through an optimization test of an adhesion primer layer and an elastic primer layer, so that the above problems of cracking, whitening and yellowing are avoided.

The sources of a radiation-cured elastic wear-resistant primer layer 312, a radiation-cured elastic matte primer layer 313 and a radiation-cured wear-resistant finish paint layer 32 are not particularly limited by the present application, and the radiation-cured elastic wear-resistant primer layer 312, the radiation-cured elastic matte primer layer 313 and the radiation-cured wear-resistant finish paint layer 32 can be directly purchased or can be prepared by oneself; and in an embodiment, the radiation-cured elastic wear-resistant primer layer 312, the radiation-cured elastic matte primer layer 313 and the radiation-cured wear-resistant finish paint layer 32 are purchased from Hunan Bonfert New Materials Technology Co., Ltd, models of which are BMZ322H, BMZ-3331H and BMZ-1052A respectively.

In order to better understand the above technical solution, the above technical solution is described in detail below in combination with specific examples. It is essential to point out herein that the following examples are merely intended to further illustrate the present application and are not construed as limitation to the scope of protection of the present application, and that some non-essential modifications and adaptations made by those skilled in the art according to the above content of the present application still fall within the scope of protection of the present application. The radiation-cured elastic wear-resistant primer layer 312, the radiation-cured elastic matte primer layer 313 and the radiation-cured wear-resistant finish paint layer 32 are purchased from Hunan Bonfert New Materials Technology Co., Ltd, models of which are BMZ322H, BMZ-3331H and BMZ-1052A respectively.

Example 1

Example 1 of the present application provides the multi-coating radiation-cured pre-coating film, which sequentially comprises the flexible transparent film layer 1 and the radiation-cured coating 3 from bottom to top, wherein the radiation-cured coating 3 sequentially comprises the radiation-cured elastic primer layer 31 and the radiation-cured wear-resistant finish paint layer 32 from bottom to top, the at least one radiation-cured elastic primer layer 31 and the at least one radiation-cured wear-resistant finish paint layer 32 are arranged, and the radiation-cured elastic primer layer 31 sequentially comprises the radiation-cured elastic wear-resistant primer layer 312 and the radiation-cured elastic matte/bright primer layer 313 from bottom to top;

the pretreatment layer 2 used for pretreating the surface of the flexible transparent film layer 1 is arranged between the flexible transparent film layer 1 and the radiation-cured coating 3, and the bottom layer of the radiation-cured elastic wear-resistant primer layer 312 is provided with the radiation-cured elastic adhesion primer layer 311; the thickness of the flexible transparent film layer is 350 µm;

the layer number of the radiation-cured elastic primer layer is 1, and the layer number of the radiation-cured wear-resistant finish paint layer is 1;

the preparation raw materials of the pretreatment layer 2 comprise, in parts by weight, 6 parts of the bifunctional polyurethane acrylate resin, 3 parts of the vinyl chloride-vinyl acetate resin, 35 parts of the bifunctional acrylate monomers, 40 parts of the solvents, and 0.5 part of the initiator;

the preparation materials of the radiation-cured elastic adhesion primer layer 311 comprise, in parts by weight, 45 parts of the bifunctional polyurethane acrylate resin, 30 parts of the bifunctional acrylate monomers, 13 parts of the monofunctional acrylate, and 3 parts of the initiators;

the bifunctional acrylate monomer is the 1,6-hexanediol diacrylate, and the vinyl chloride-vinyl acetate resin is purchased from Dongguan Yifan Resin Co., Ltd., which is the vinyl chloride-vinyl acetate resin 14-50;

the solvent is the butyl acetate;

the monofunctional acrylate is the isobornyl acrylate and the acryloylmorpholine, and the weight ratio of the isobornyl acrylate to the acryloylmorpholine is 1:0.5;

the initiator is the (2,4,6-trimethylbenzoyl) diphenyl phosphine oxide (TPO);

the preparation materials of the bifunctional polyurethane acrylate resin comprise the polyol, the isocyanate, and the hydroxyl-containing acrylate monomers, and the molar ratio of the polyol to the isocyanate is 1:3.5; the content of the hydroxyl-containing acrylate monomers is used for completely blocking the isocyanate;

the polyol comprises the component A polyol and the component B polyol, and the molar ratio of component A to component B is 2:1;

the component A polyol comprises the polycaprolactone dihydric alcohol, the polyneopentyl glycol adipate dihydric alcohol and the polycarbonate dihydric alcohol, and the weight ratio of the polycaprolactone dihydric alcohol to the polyneopentyl glycol adipate dihydric alcohol to the polycarbonate dihydric alcohol is 1:1:0.6;

the weight-average molecular weight of the polycaprolactone dihydric alcohol is 2000 to 2500, the weight-average molecular weight of the polyneopentyl glycol adipate dihydric alcohol is 3000 to 3500, and the weight-average molecular weight of the polycarbonate dihydric alcohol is 3000 to 3500;

the component B polyol comprises the 1,4-butanediol, the 1,4-cyclohexanedimethanol, and the hydroxyethylated bisphenol A, and the weight ratio of the 1,4-butanediol to the 1,4-cyclohexanedimethanol to the hydroxyethylated bisphenol A is 1:0.45:0.2;

the hydroxyl-containing acrylate monomer is the hydroxy methyl acrylate;

the isocyanate is the hexamethylene diisocyanate;

the flexible transparent film layer is made of the PVC film;

the preparation method for the multi-coating radiation-cured pre-coating film is as follows:

(1) uniformly stirring the preparation raw materials of the pretreatment layer 2 and the radiation-cured elastic adhesion primer layer 311 through dispersing kettles separately;

(2) uniformly coating the surface of the flexible transparent film layer 1 with the pretreatment layer 2 through the roller, and performing LED curing, wherein the wavelength of the LED light source is 395 nm, and the energy intensity of the lamp source is 10 W/cm$^2$;

(3) uniformly coating the surface of the pretreatment layer 2 with the radiation-cured elastic adhesion primer layer 311 through the roller, and performing LED curing, wherein the wavelength of the LED light source is 395 nm, and the energy intensity of the lamp source is 10 W/cm$^2$;

(4) uniformly coating the surface of the radiation-cured elastic adhesion primer layer 311 with the radiation-cured elastic wear-resistant primer layer 312 through the roller, and performing LED curing, wherein the wavelength of the LED light source is 395 nm, and the energy intensity of the lamp source is 10 W/cm$^2$;

(5) uniformly coating the surface of the radiation-cured elastic wear-resistant primer layer 312 with the radiation-cured elastic matte primer layer 313 through the roller, and performing LED curing, wherein the wavelength of the LED light source is 395 nm, and the energy intensity of the lamp source is 10 W/cm$^2$; and (6) uniformly coating the surface of the radiation-cured elastic matte primer layer 313 with the radiation-cured wear-resistant finish paint layer 32 through the roller, and performing mercury lamp curing; and obtaining the multi-coating radiation-cured pre-coating film;

the coating weight of the radiation-cured elastic adhesion primer layer is 10 g/m$^2$, the coating weight of the radiation-cured elastic wear-resistant primer layer is 50 g/m$^2$, the coating weight of the radiation-cured elastic matte primer layer is 12 g/m$^2$, and the coating weight of the radiation-cured wear-resistant finish paint layer is 13 g/m$^2$; and the coating weight of the pretreatment layer 2 is 4 g/m$^2$.

Example 2

Example 2 of the present application provides the multi-coating radiation-cured pre-coating film, which sequentially comprises the flexible transparent film layer 1 and the radiation-cured coating 3 from bottom to top, wherein the radiation-cured coating 3 sequentially comprises the radiation-cured elastic primer layer 31 and the radiation-cured wear-resistant finish paint layer 32 from bottom to top, the at least one radiation-cured elastic primer layer 31 and the at least one radiation-cured wear-resistant finish paint layer 32 are arranged, and the radiation-cured elastic primer layer 31 sequentially comprises the radiation-cured elastic wear-resistant primer layer 312 and the radiation-cured elastic matte primer layer 313 from bottom to top;

the pretreatment layer 2 used for pretreating the surface of the flexible transparent film layer 1 is arranged between the flexible transparent film layer 1 and the radiation-cured coating 3, and the bottom layer of the radiation-cured elastic wear-resistant primer layer 312 is provided with the radiation-cured elastic adhesion primer layer 311; the thickness of the flexible transparent film layer is 500 µm;

the layer number of the radiation-cured elastic primer layer is 3, and the layer number of the radiation-cured wear-resistant finish paint layer is 3;

the preparation raw materials of the pre-treatment layer 2 comprise, in parts by weight, 10 parts of the bifunctional polyurethane acrylate resin, 5 parts of the vinyl chloride-vinyl acetate resin, 40 parts of the bifunctional acrylate monomers, 50 parts of the solvents, and 1 part of the initiator;

the preparation materials of the radiation-cured elastic adhesion primer layer 311 comprise, in parts by weight, 60 parts of the bifunctional polyurethane acrylate resin, 40 parts of the bifunctional acrylate monomers, 15 parts of the monofunctional acrylate, and 5 parts of the initiators;

the bifunctional acrylate monomer is the 1, 6-hexanediol diacrylate, and the vinyl chloride-vinyl acetate resin is purchased from Dongguan Yifan Resin Co., Ltd., which is the vinyl chloride-vinyl acetate resin 14-50;

the solvent is the butyl acetate;

the monofunctional acrylate is the isobornyl acrylate and the acryloylmorpholine, and the weight ratio of the isobornyl acrylate to the acryloylmorpholine is 1:0.8;

the initiator is the (2, 4, 6-trimethylbenzoyl) diphenyl phosphine oxide (TPO);

the preparation materials of the bifunctional polyurethane acrylate resin comprise the polyol, the isocyanate, and the hydroxyl-containing acrylate monomers;

the molar ratio of the polyol to the isocyanate is 1:5; the content of the hydroxyl-containing acrylate monomers is used for completely blocking the isocyanate;

the polyol comprises the component A polyol and the component B polyol, and the molar ratio of component A to component B is 3:1;

the component A polyol comprises the polycaprolactone dihydric alcohol, the polyneopentyl glycol adipate dihydric alcohol and the polycarbonate dihydric alcohol, and the weight ratio of the polycaprolactone dihydric alcohol to the polyneopentyl glycol adipate dihydric alcohol to the polycarbonate dihydric alcohol is 1:1.5:1.5;

the weight-average molecular weight of the polycaprolactone dihydric alcohol is 2000 to 2500, the weight-average molecular weight of the polyneopentyl glycol adipate dihydric alcohol is 3000 to 3500, and the weight-average molecular weight of the polycarbonate dihydric alcohol is 3000 to 3500;

the component B polyol comprises the 1,4-butanediol, the 1,4-cyclohexanedimethanol, and the hydroxyethylated bisphenol A, and the weight ratio of the 1,4-butanediol to the 1,4-cyclohexanedimethanol to the hydroxyethylated bisphenol A is 1:0.5:0.3;

the hydroxyl-containing acrylate monomer is the hydroxy methyl acrylate;

the isocyanate is the hexamethylene diisocyanate;

the flexible transparent film layer is made of the PVC film;

the preparation method for the multi-coating radiation-cured pre-coating film is as follows:

(1) uniformly stirring the preparation raw materials of the pretreatment layer 2 and the radiation-cured elastic adhesion primer layer 311 through dispersing kettles separately;

(2) uniformly coating the surface of the flexible transparent film layer 1 with the pretreatment layer 2 through the roller, and performing LED curing, wherein the wavelength of the LED light source is 395 nm, and the energy intensity of the lamp source is 10 W/cm$^2$;

(3) uniformly coating the surface of the pretreatment layer 2 with the radiation-cured elastic adhesion primer layer 311 through the roller, and performing LED curing, wherein the wavelength of the LED light source is 395 nm, and the energy intensity of the lamp source is 10 W/cm$^2$;

(4) uniformly coating the surface of the radiation-cured elastic adhesion primer layer 311 with the radiation-cured elastic wear-resistant primer layer 312 through the roller, and performing LED curing, wherein the wavelength of the LED light source is 395 nm, and the energy intensity of the lamp source is 10 W/cm$^2$;

(5) uniformly coating the surface of the radiation-cured elastic wear-resistant primer layer 312 with the radiation-cured elastic matte primer layer 313 through the roller, and performing LED curing, wherein the wavelength of the LED light source is 395 nm, and the energy intensity of the lamp source is 10 W/cm$^2$; and (6) uniformly coating the surface of the radiation-cured elastic matte primer layer 313 with the radiation-cured wear-resistant finish paint layer 32 through the roller, and performing mercury lamp curing; and obtaining the multi-coating radiation-cured pre-coating film;

the coating weight of the radiation-cured elastic adhesion primer layer is 10 g/m$^2$, the coating weight of the radiation-cured elastic wear-resistant primer layer is 50 g/m$^2$, the coating weight of the radiation-cured elastic matte primer layer is 12 g/m$^2$, and the coating weight of the radiation-cured wear-resistant finish paint layer is 13 g/m$^2$; and the coating weight of the pretreatment layer 2 is 4 g/m$^2$.

Example 3

Example 3 of the present application provides the multi-coating radiation-cured pre-coating film, which sequentially comprises the flexible transparent film layer 1 and the radiation-cured coating 3 from bottom to top, wherein the radiation-cured coating 3 sequentially comprises the radiation-cured elastic primer layer 31 and the radiation-cured wear-resistant finish paint layer 32 from bottom to top, the at least one radiation-cured elastic primer layer 31 and the at least one radiation-cured wear-resistant finish paint layer 32 are arranged, and the radiation-cured elastic primer layer 31 sequentially comprises the radiation-cured elastic wear-resistant primer layer 312 and the radiation-cured elastic matte primer layer 313 from bottom to top;

the pretreatment layer 2 used for pretreating the surface of the flexible transparent film layer 1 is arranged between the flexible transparent film layer 1 and the radiation-cured coating 3, and the bottom layer of the radiation-cured elastic wear-resistant primer layer 312 is provided with the radiation-cured elastic adhesion primer layer 311; the thickness of the flexible transparent film layer is 200 μm;

the layer number of the radiation-cured elastic primer layer is 1, and the layer number of the radiation-cured wear-resistant finish paint layer is 1;

the preparation raw materials of the pretreatment layer 2 comprise, in parts by weight, 2 parts of the bifunctional polyurethane acrylate resin, 1 part of the vinyl chloride-vinyl acetate resin, 30 parts of the bifunctional acrylate monomers, 30 parts of the solvents, and 0.1 part of the initiator;

the preparation materials of the radiation-cured elastic adhesion primer layer 311 comprise, in parts by weight, 30 parts of the bifunctional polyurethane acrylate resin, 20 parts of the bifunctional acrylate monomers, 10 parts of the monofunctional acrylate, and 1 part of the initiator;

the bifunctional acrylate monomer is the 1, 6-hexanediol diacrylate, and the vinyl chloride-vinyl acetate resin is purchased from Dongguan Yifan Resin Co., Ltd., which is the vinyl chloride-vinyl acetate resin 14-50;

the solvent is the butyl acetate;

the monofunctional acrylate is the isobornyl acrylate and the acryloylmorpholine, and the weight ratio of the isobornyl acrylate to the acryloylmorpholine is 1:0.3;

the initiator is the (2, 4, 6-trimethylbenzoyl) diphenyl phosphine oxide (TPO);

the preparation materials of the bifunctional polyurethane acrylate resin comprise the polyol, the isocyanate, and the hydroxyl-containing acrylate monomers;

the molar ratio of the polyol to the isocyanate is 1:3; the content of the hydroxyl-containing acrylate monomers is used for completely blocking the isocyanate;

the polyol comprises the component A polyol and the component B polyol, and the molar ratio of component A to component B is 1.5:1;

the component A polyol comprises the polycaprolactone dihydric alcohol, the polyneopentyl glycol adipate dihydric alcohol and the polycarbonate dihydric alcohol, and the weight ratio of the polycaprolactone dihydric alcohol to the polyneopentyl glycol adipate dihydric alcohol to the polycarbonate dihydric alcohol is 1:0.5:0.5;

the weight-average molecular weight of the polycaprolactone dihydric alcohol is 2000 to 2500, the weight-average molecular weight of the polyneopentyl glycol adipate dihydric alcohol is 3000 to 3500, and the weight-average molecular weight of the polycarbonate dihydric alcohol is 3000 to 3500;

micromolecular dihydric alcohol comprises the 1,4-butanediol, the 1,4-cyclohexanedimethanol, and the hydroxyethylated bisphenol A, and the weight ratio of the 1,4-butanediol to the 1,4-cyclohexanedimethanol to the hydroxyethylated bisphenol A is 1:0.3:0.1;

the hydroxyl-containing acrylate monomer is the hydroxy methyl acrylate;

the isocyanate is the hexamethylene diisocyanate;

the flexible transparent film layer is made of the PVC film; and the preparation method for the multi-coating radiation-cured pre-coating film is the same as the preparation method in Example 1.

Example 4

Example 4 of the present application provides the multi-coating radiation-cured pre-coating film, specific implementation of which is similar to that of Example 1 and is different in that no pretreatment layer 2 used for pretreating the surface of the flexible transparent film layer 1 is arranged between the flexible transparent film layer 1 and the radiation-cured coating 3.

Example 5

Example 5 of the present application provides the multi-coating radiation-cured pre-coating film, specific implementation of which is similar to that of Example 1 and is different in that the preparation raw materials of the pretreatment layer 2 comprise, in parts by weight, 0 part of the bifunctional polyurethane acrylate resin, 3 parts of the vinyl chloride-vinyl acetate resin, 35 parts of the bifunctional acrylate monomers, 40 parts of the solvents, and 0.5 part of the initiator.

Example 6

Example 6 of the present application provides the multi-coating radiation-cured pre-coating film, specific implementation of which is similar to that of Example 1 and is different in that the preparation raw materials of the pretreatment layer 2 comprise, in parts by weight, 25 parts of the bifunctional polyurethane acrylate resin, 3 parts of the vinyl chloride-vinyl acetate resin, 35 parts of the bifunctional acrylate monomers, 40 parts of the solvents, and 0.5 part of the initiator.

Example 7

Example 7 of the present application provides the multi-coating radiation-cured pre-coating film, specific implementation of which is similar to that of Example 1 and is different in that the preparation raw materials of the pretreatment layer 2 comprise, in parts by weight, 6 parts of the bifunctional polyurethane acrylate resin, 0 part of the vinyl chloride-vinyl acetate resin, 35 parts of the bifunctional acrylate monomers, 40 parts of the solvents, and 0.5 part of the initiator.

Example 8

Example 8 of the present application provides the multi-coating radiation-cured pre-coating film, specific implementation of which is similar to that of Example 1 and is different in that the bottom layer of the radiation-cured elastic wear-resistant primer layer 312 is not provided with the radiation-cured elastic adhesion primer layer 311.

Example 9

Example 9 of the present application provides the multi-coating radiation-cured pre-coating film, specific implementation of which is similar to Example 1 and is different in that the preparation materials of the radiation-cured elastic adhesion primer layer 311 comprise, in parts by weight, 0 part of the bifunctional polyurethane acrylate resin, 30 parts of the bifunctional acrylate monomers, 13 parts of the monofunctional acrylate, and 3 parts of the initiators.

Example 10

Example 10 of the present application provides the multi-coating radiation-cured pre-coating film, specific implementation of which is similar to that of Example 1 and is different in that the preparation materials of the radiation-cured elastic adhesion primer layer 311 comprise, in parts by weight, 15 parts of the bifunctional polyurethane acrylate resin, 30 parts of the bifunctional acrylate monomers, 13 parts of the monofunctional acrylate, and 3 parts of the initiators.

Performance Evaluation

A pre-coating film layer material obtained in embodiments and a SPC base plate are heated to 175° C., rolled for 5 seconds through a steel roller, and formed through cooling to obtain a composite material.

1. Adhesive force test: measuring adhesive force of the composite material prepared from the pre-coating film obtained in the Examples 1 to 10 according to standard ASTM D3359, wherein test results are shown in Table 1; and 2. PVC pre-coating film processing performance test: observing whether the cracking problem of the pre-coating film occurs in the process of preparing the composite material from the pre-coating film obtained in the Examples 1 to 10, wherein each example corresponds to 100 samples, the cracking probability is calculated, and test results are shown in Table 1.

TABLE 1

| | Performance test results | |
| --- | --- | --- |
| | Adhesive force | Cracking (%) |
| Example 1 | 5B | 0 |
| Example 2 | 5B | 2 |
| Example3 | 5B | 1 |
| Example 4 | 2B | 42 |
| Example 5 | 4B | 36 |
| Example 6 | 4B | 16 |
| Example 7 | 3B | 9 |
| Example 8 | 4B | 59 |
| Example 9 | 4B | 39 |
| Example 10 | 4B | 12 |

Experimental results show that the adhesive force of a PVC pre-coating film layer on a surface of the base plate is improved by utilizing an adhesion bottom layer and an elastic bottom layer to cooperate with a PVC flexible film material, meanwhile, the good processing performance can be further maintained under a high-temperature condition, and the problems of whitening, cracking, yellowing and the like cannot be caused.

The foregoing embodiments are illustrative only and are intended to explain some features of the method described in the present application. The appended claims are intended to claim the conceivable scope as broad as possible, and the embodiments presented herein are illustrative only of implementation selected in accordance with a combination of all possible embodiments. Therefore, the intention of the applicant is that the appended claims will not be limited by the choice of the embodiments illustrating the features of the present application. Some numerical ranges used in the claims are also inclusive of subranges therein and variations in these ranges should also be interpreted as being covered by the appended claims where possible.

What is claimed is:

1. A multi-coating radiation-cured pre-coating film, comprising a flexible transparent film layer and a radiation-cured coating sequentially from bottom to top, wherein the radiation-cured coating comprises at least one radiation-cured elastic primer layer and at least one radiation-cured wear-resistant finish paint layer sequentially from bottom to top, and each of the at least one radiation-cured elastic primer layer comprises a radiation-cured elastic wear-resistant primer layer and a radiation-cured elastic bright primer layer sequentially from bottom to top, wherein a pretreatment layer used for pretreating a surface of the flexible transparent film layer is arranged between the flexible transparent film layer and the radiation-cured coating, wherein preparation of raw materials of the pretreatment layer comprises, in parts by weight, 4 to 8 parts of bifunctional polyurethane acrylate resin, 1 to 4 parts of vinyl chloride-vinyl acetate resin, 33 to 38 parts of bifunctional acrylate monomer, 35 to 45 parts of solvent, and 0.2 to 0.8 parts of initiator.

2. The multi-coating radiation-cured pre-coating film according to claim 1, wherein a bottom layer of the radiation-cured elastic wear-resistant primer layer is provided with a radiation-cured elastic adhesion primer layer.

3. The multi-coating radiation-cured pre-coating film according to claim 2, wherein preparation materials of the radiation-cured elastic adhesion primer layer comprise, in parts by weight, 30 to 60 parts of bifunctional polyurethane acrylate resin, 20 to 40 parts of bifunctional acrylate monomer, 10 to 15 parts of monofunctional acrylate, and 0 to 5 parts of initiator.

4. The multi-coating radiation-cured pre-coating film according to claim 3, wherein the monofunctional acrylate is one or more selected from the group consisting of isobornyl acrylate, acryloylmorpholine, 2-hydroxyethyl methacrylate, n-propyl acrylate, n-butyl acrylate, lauryl acrylate, octadecyl acrylate, isopropyl acrylate, isobutyl acrylate, tert-butyl acrylate, hydroxyethyl acrylate, hydroxypropyl acrylate, hydroxybutyl acrylate, and ethoxyethyl acrylate.

5. The multi-coating radiation-cured pre-coating film according to claim 1, wherein a relative molecular weight of the bifunctional polyurethane acrylate resin is greater than 3000; and preparation materials of the bifunctional polyurethane acrylate resin comprise polyol, isocyanate, and hydroxyl-containing acrylate monomers, wherein a molar ratio of the polyol to the isocyanate is 1:2 to 1:5.

6. The multi-coating radiation-cured pre-coating film according to claim 5, wherein the polyol comprises component A polyol and component B polyol, the relative molecular weight of component A is 500 to 10000, the relative molecular weight of component B is 30 to 450, and a molar ratio of component A to component B is 1:1 to 3:1.

7. A composite material containing the multi-coating radiation-cured pre-coating film according to claim 1.

* * * * *